United States Patent
Shirai et al.

(12) 
(10) Patent No.: US 6,446,856 B2
(45) Date of Patent: Sep. 10, 2002

(54) METHOD OF WELDING COMPOSITE MEMBER

(75) Inventors: Hideaki Shirai, Okazaki; Takafumi Sato, Aichi-pref.; Eiji Iwanari, Chiryu; Yoshinori Ohmi, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/797,979

(22) Filed: Mar. 5, 2001

(30) Foreign Application Priority Data

Mar. 6, 2000 (JP) ........................................ 2000-060838
Mar. 7, 2000 (JP) ........................................ 2000-062221

(51) Int. Cl.[7] .......................... B23K 31/02; B23K 1/11; B21D 39/04
(52) U.S. Cl. ...................... 228/103; 228/131; 228/175; 219/61; 219/91.2
(58) Field of Search ................ 228/103, 124.6, 228/126, 127, 128, 129, 130, 131, 175, 227; 219/59.1, 60 R, 60.2, 61, 91.2

(56) References Cited

U.S. PATENT DOCUMENTS

| | | | |
|---|---|---|---|
| 3,780,254 A | * | 12/1973 | Rygiol |
| 4,349,957 A | * | 9/1982 | Lundin |
| 4,455,468 A | * | 6/1984 | Satterthwaite |
| 4,585,917 A | * | 4/1986 | Yoshida et al. |
| 4,880,087 A | * | 11/1989 | Janes |
| 5,263,631 A | * | 11/1993 | Felber |
| 5,349,737 A | * | 9/1994 | Long |
| 5,364,130 A | * | 11/1994 | Thalmann |
| 5,368,223 A | * | 11/1994 | Chevrel et al. |
| 5,465,468 A | * | 11/1995 | Manna |
| 5,695,045 A | * | 12/1997 | Mergell et al. |
| 6,210,042 B1 | * | 4/2001 | Wang et al. |

FOREIGN PATENT DOCUMENTS

| | | |
|---|---|---|
| JP | 57-85689 | 5/1982 |
| JP | 62-134118 | 6/1987 |
| JP | 20011252778 A | * 9/2001 |

OTHER PUBLICATIONS

US 2001/0019074A1 Shirai et al. (Sep. 6, 2001).*

* cited by examiner

Primary Examiner—Tom Dunn
Assistant Examiner—Kiley Stoner
(74) Attorney, Agent, or Firm—Harness, Dickey & Pierce, PLC

(57) ABSTRACT

A method of welding a hollow member and an insert member to form a composite member including a hollow member and insertion member requiring a high dimensional accuracy in the end-to-end distance in the axial direction and requiring a reliable concentricity in the center axes of the hollow member and insertion member, including preparing a hollow member and insertion member, inserting the insertion member in the hollow member, providing spot welds at an overlap portion where the hollow member and insertion member overlap to correct the axial end-to-end distance of the hollow member and the insertion member, and providing a partial weld at an overlap portion where the hollow member and insertion member overlap to correct the concentricity of the hollow member and the insertion member.

22 Claims, 18 Drawing Sheets

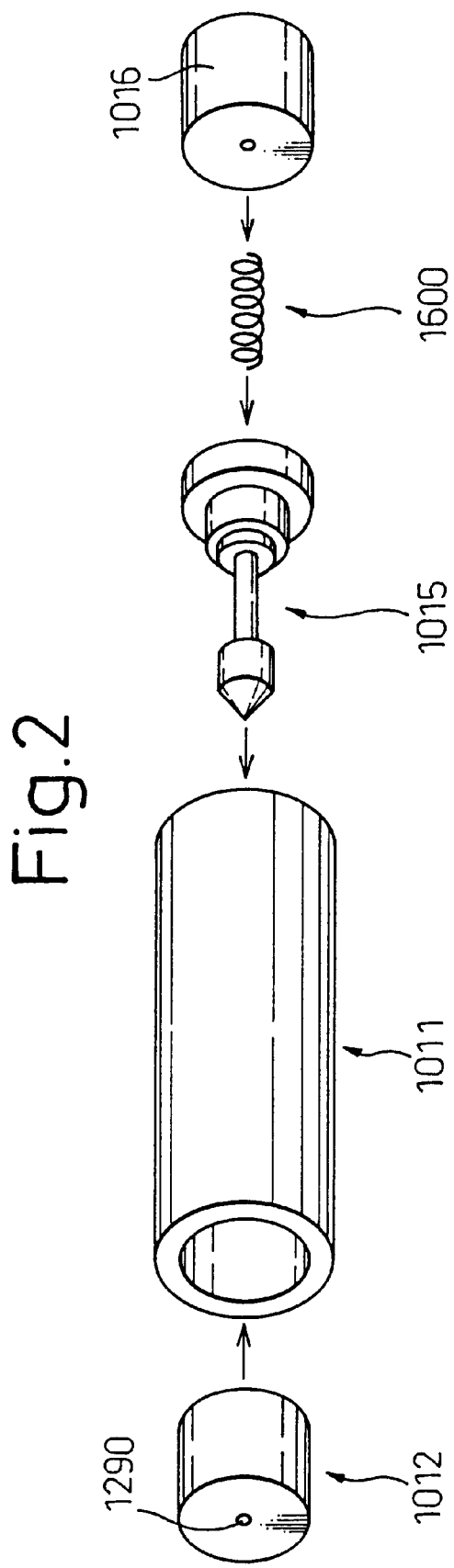

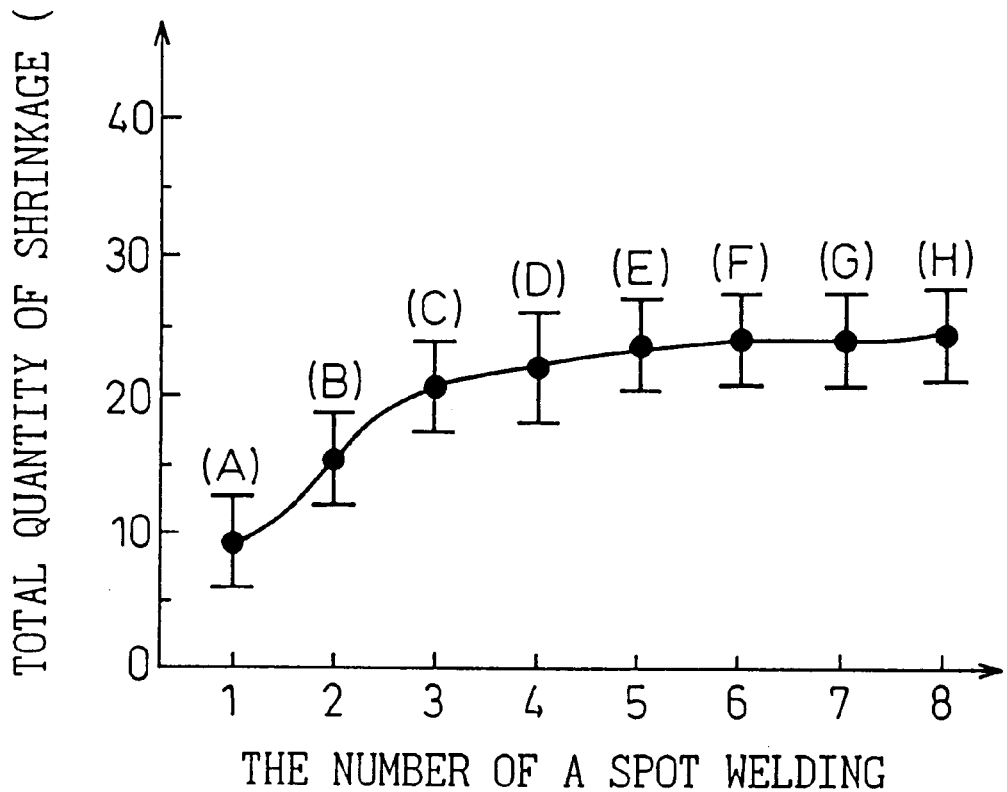

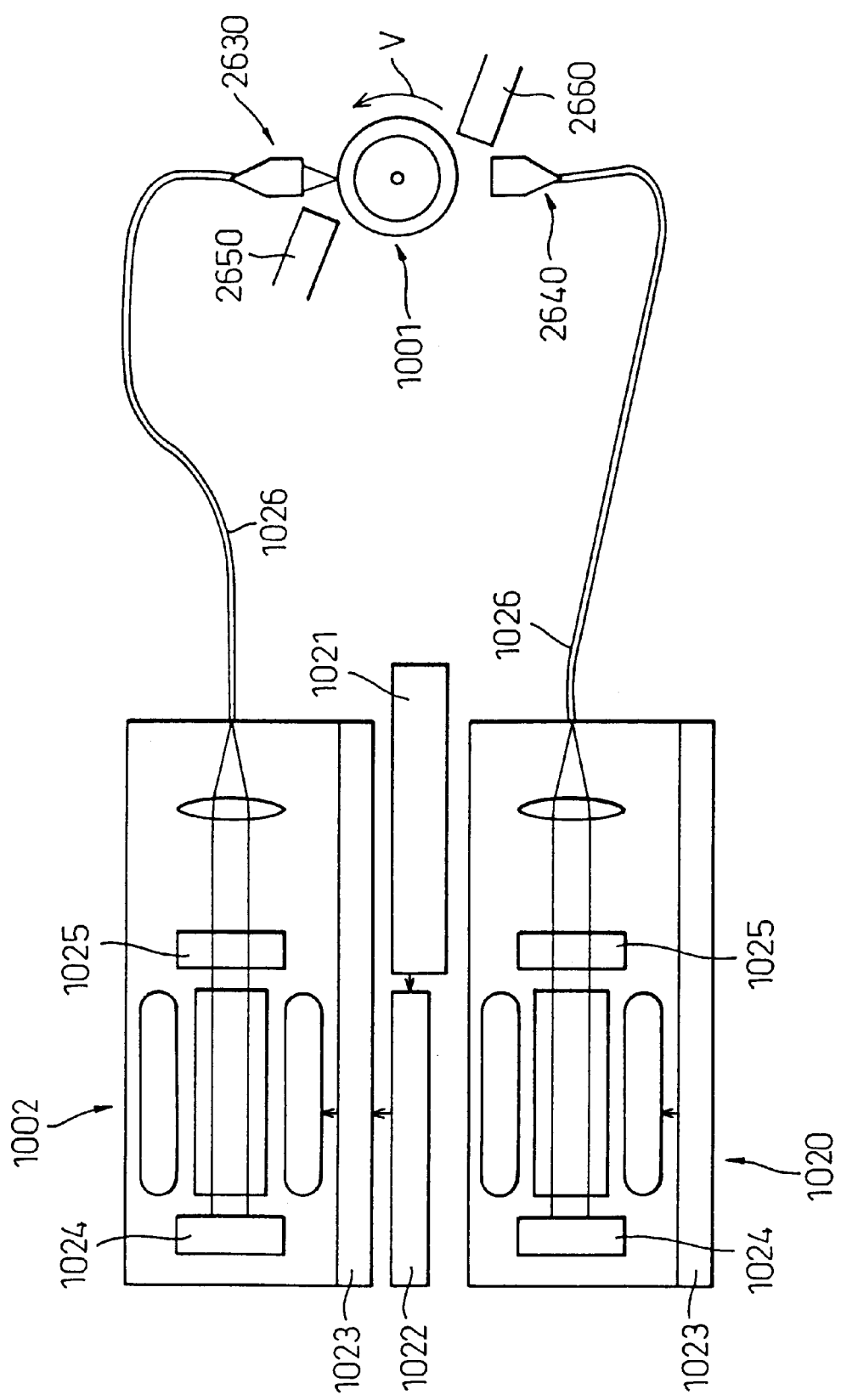

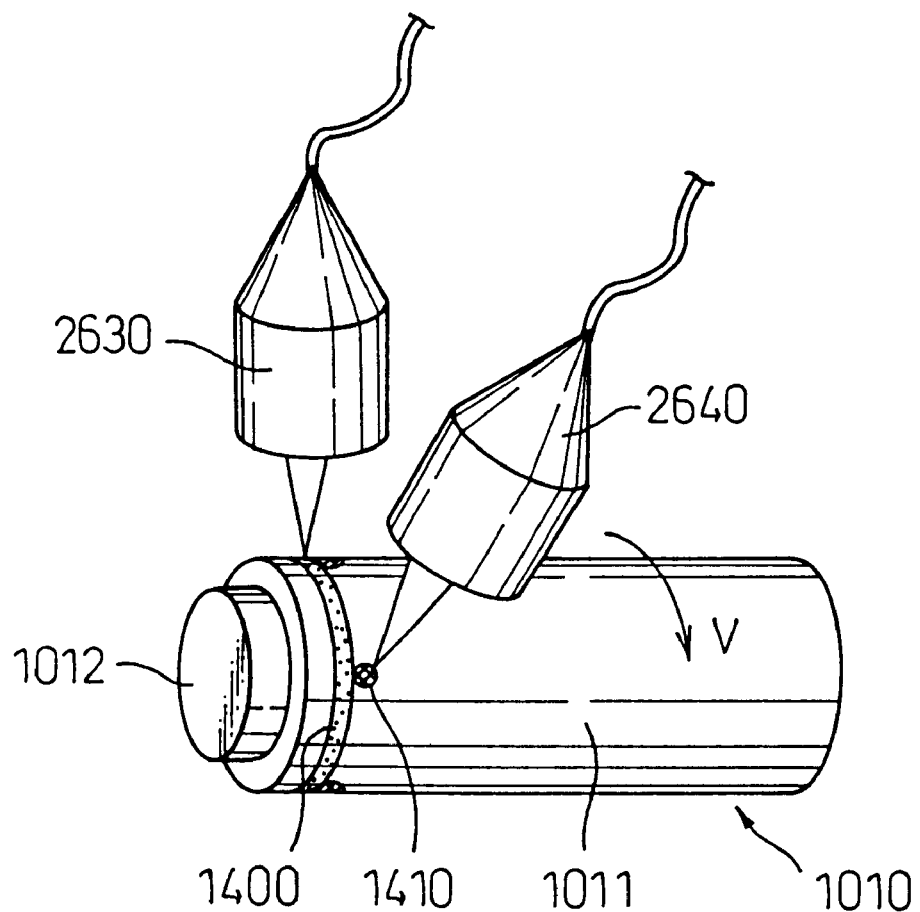

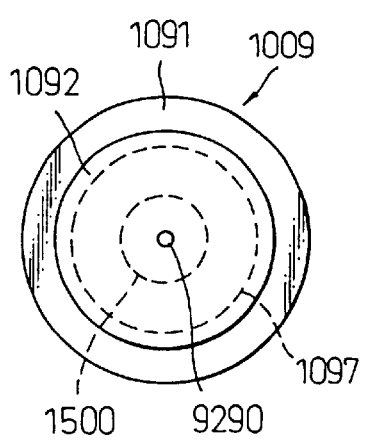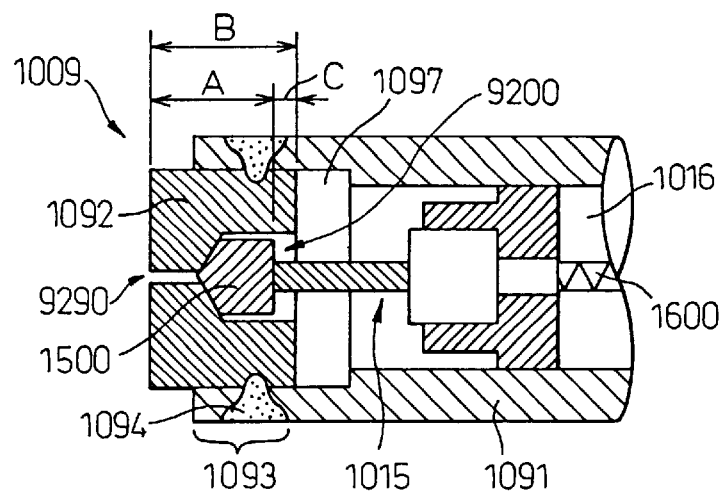

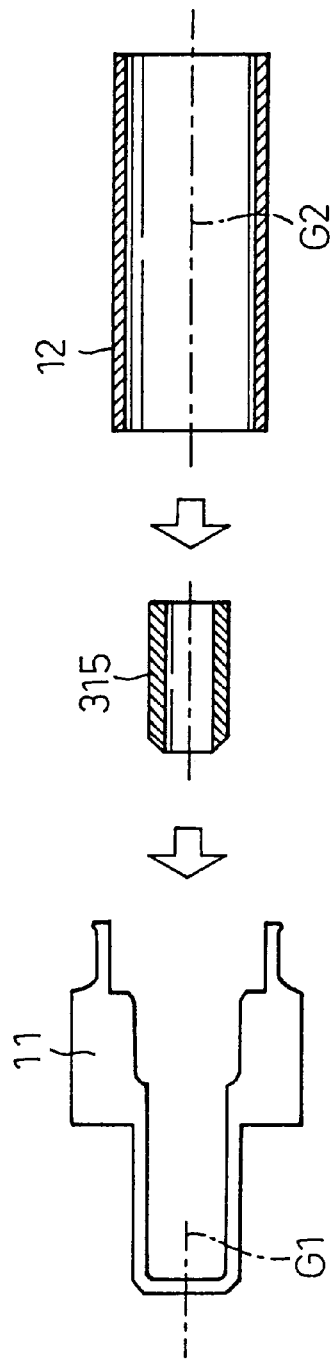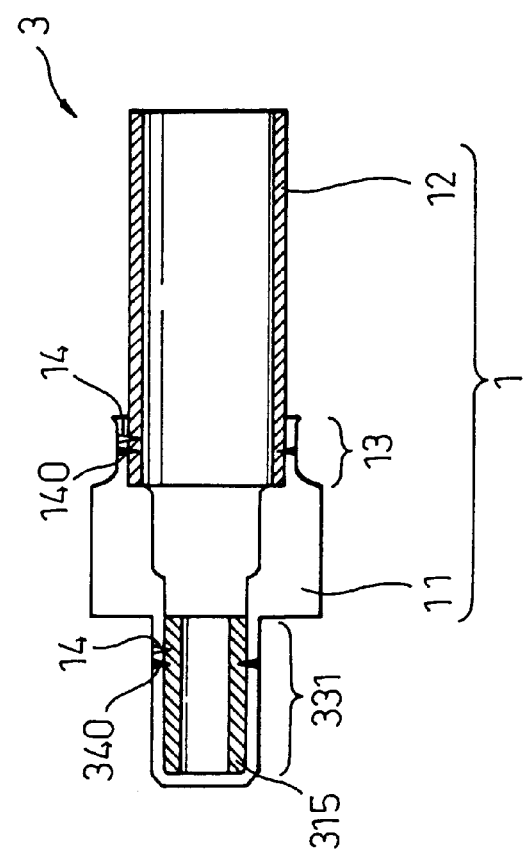
Fig.14(a)
Fig.14(b)

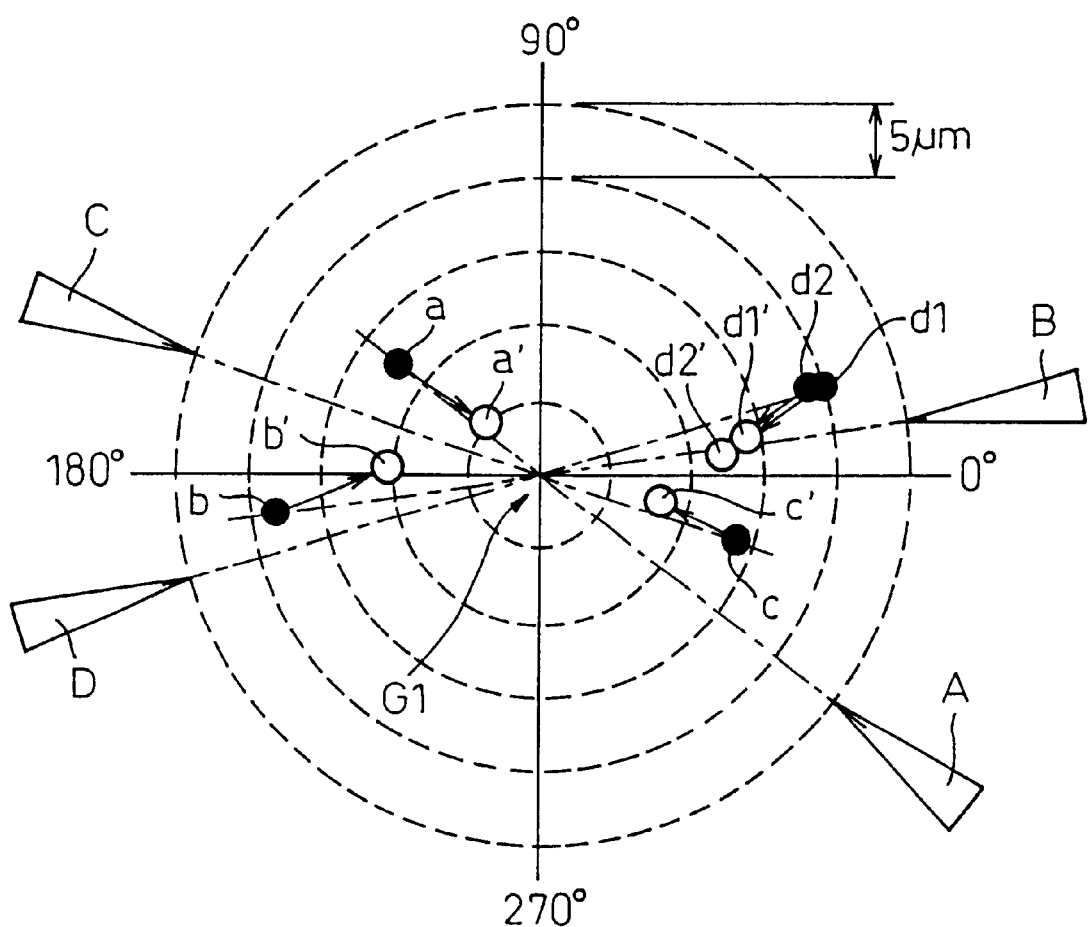

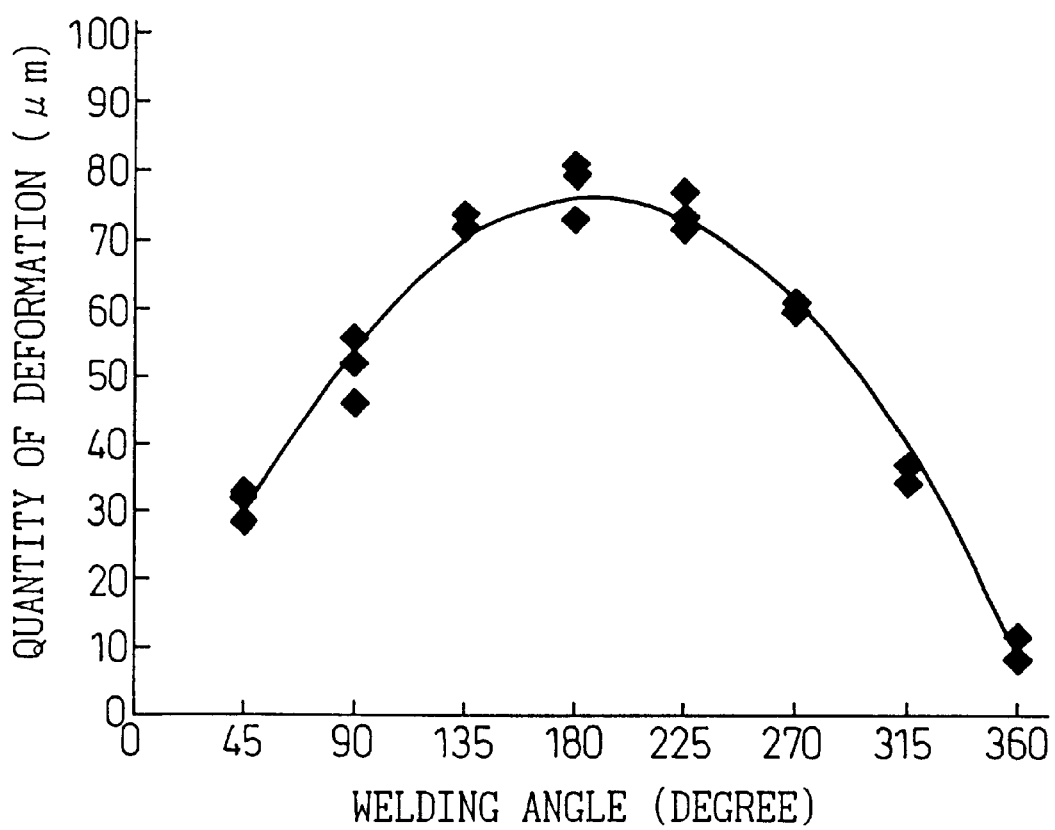

METHOD OF WELDING COMPOSITE MEMBER

BACKGROUND OF THE INVENTION

1. Field of the Invention

The present invention relates to a method of welding a hollow member and an insertion member to form a composite member comprised of a hollow member such as a valve structure of a fuel injection system and an insertion member which is inserted into and joined to the hollow member and, more particularly, relates to a method of welding a hollow member and an insertion member to form a composite member comprised of a hollow member and insertion member where a high dimensional accuracy is required in the axial end-to-end distance of the end faces and where a reliable concentricity is required in the center axes of the hollow member and insertion member.

2. Description of the Related Art

An example of the valve structure of a fuel injection system in an internal combustion engine of the related art where concentricity is required will be explained first. As shown in FIG. 14(a) and FIG. 14(b), the valve structure 3 of the related art is comprised of a cylindrical hollow member 11 having a closed bottom, that is, a holder, a cylindrical body 315 to be inserted into and accommodated in the hollow member 11, and an insertion member 12 to be inserted in the hollow member 11.

The overlap portion 13 where the hollow member 11 and the insertion member 12 overlap and the overlap portion 331 where the hollow member 11 and the body 315 overlap are circumferentially welded together.

Next, another example of the valve structure of a fuel injection system in an internal combustion engine of the related art where a high dimensional accuracy is required in the end-to-end distance of the end faces will be explained.

As shown in FIG. 13(a) and FIG. 13(b), the valve structure is comprised of a cylindrical housing 1091, a nozzle receiver 9200 comprised to be able to receive the nozzle portion 1500, a body 1092 provided with an injection bore 9290 communicating with the nozzle holder 9200, a needle 1015 provided with the nozzle portion 1500, and a holding member 1016 provided with a spring 1600 for holding the needle 1015.

In the related art, the body 1092 is inserted into one end of the housing 1091 and the needle 1015 held in the holding member 1016 is inserted into the other end to thereby assemble the parts and form the valve structure 1009.

The overlap portion 1093 of the housing 1091 and the body 1092 is circumferentially welded together. Reference numeral 094 indicates the weld.

Thermal strain occurs at the time of circumferentially welding the overlap portion 1093 and sometimes results in deviation of the dimensions of the valve structure in the axial direction from the desired values.

In the valve structure 1009, the clearance C shown in FIG. 13(b) has to be of a predetermined dimension.

Therefore, in the related art, a spacer 1097 was arranged behind the body 1092 as shown in FIG. 13(b) to absorb the thermal strain at the time of circumferential welding and thereby ensure a suitable clearance C and a suitable range of operation of the needle 1015.

In the related art, the dimensions of A and B shown in FIG. 13(b) are measured at the time of assembling the parts, and the body 1092 etc. are ground to obtain the suitable clearance C. Next, the housing 1091 and the body 1092 are circumferentially welded to join them. The thermal strain accompanying the circumferential welding is absorbed by the spacer 1097.

Therefore, it is possible to obtain a valve structure 1009 resistant to the effects of changes in dimensions due to thermal strain and having precise dimensional accuracy.

Summarizing the problem to be solved by the invention, since thermal strain occurs at the time of circumferential welding in a valve structure of a fuel injection system of the related art where concentricity is required, even if the hollow member 11 and the insertion member 12 are assembled to have the same center axes G1 and G2, there is the problem that the center axes G1 and G2 become misaligned as shown in the later explained FIG. 18(a), FIG. 18(b), and FIG. 19 in the later circumferential welding. Note that from here on, the state where the center axes G1 and G2 are correctly aligned will be referred to as "good concentricity", while the state where they are not aligned will be referred to as "poor concentricity".

Further, in the valve structure of the other related art where a high dimensional accuracy is required in the axial end-to-end distance, the spacer 1097 has to be separately provided. Not only is the trouble of assembly increased, but also, while it is possible to absorb the thermal strain by the spacer 1097 in the structure of FIG. 13(a) and FIG. 13(b) shown in the related art, this technique does not work well with other structures. Further, there is a limit to how far the dimensional changes caused by thermal strain can be minimized.

SUMMARY OF THE INVENTION

An object of the present invention is to provide a method of welding a hollow member and an insertion member to form a composite member giving a superior concentricity and a high dimensional accuracy in the axial direction.

According to a first aspect of the present invention, there is provided a method of welding a hollow member and an insertion member to form a composite member comprising preparing a hollow member and an insertion member, inserting the insertion member in the hollow member, and partially welding an overlap portion where the hollow member and the insertion member overlap to correct an axial end-to-end distance of the hollow member and the insertion member in a corrective welding step.

Preferably, the method further comprises that the hollow member and the insertion member are joined together by a partial weld provided in the corrective welding step.

Alternatively, the method further comprises circumferentially welding the entire circumference of the overlap portion of the hollow member and the insertion member in a regular welding step.

More preferably, the method further comprises simultaneously performing the corrective welding step and the regular welding step by a plurality of welding heads.

Still more preferably, the method further comprises that said insertion member is press-fitted in the hollow member.

Still more preferably, the method further comprises that at least one set of partial welds are provided at axially symmetric positions (A–H) at the overlap portion in the corrective welding step.

Still more preferably, the method further comprises measuring the axial end-to-end distance of the composite member for each corrective welding step in a measurement step and continuing the corrective welding step until the axial end-to-end distance reaches a predetermined length.

Alternatively, still more preferably, the method further comprises determining an amount of melting before the corrective welding step in a melting determination step and performing the corrective welding step in accordance with the amount of melting determined in the melting determination step.

According to a second aspect of the present invention, there is provided a method of welding a hollow member and an insertion member to form a composite member comprising preparing a hollow member and an insertion member, inserting the insertion member in the hollow member, and partially welding an overlap portion of the hollow member and the insertion member correct the concentricity of the composite member in a corrective welding step.

Preferably, the method further comprises that the hollow member and the insertion member are joined together by a partial weld provided in the corrective welding step.

Alternatively, the method further comprises circumferentially welding the entire circumference of the overlap portion of the hollow member and the insertion member in a regular welding step.

Alternatively, the method further comprises consecutively performing the corrective welding step and the regular welding step.

More preferably, the method further comprises measuring an amount of deviation and direction of deviation of concentricity of the composite member for each corrective welding step and continuing the corrective welding step until the amount of deviation and direction of deviation of concentricity fall within a desired range.

Still more preferably, the method further comprises determining the partial weld formation position and an amount of melting in accordance with basic data collected in advance about the amount of deviation and direction of deviation of concentricity and performing the corrective welding step in accordance with the amount of melting determined in the melting determination step.

According to a third aspect of the present invention, there is provided a method of welding a hollow member and an insertion member to form a composite member comprising preparing a hollow member and an insertion member, inserting the insertion member in the hollow member, measuring a direction of deviation of concentricity of the composite member in a measurement step, and welding the entire circumference of an overlap portion where the hollow member and the insertion member overlap using as a weld start a position opposite in direction to the direction of deviation of concentricity.

Preferably, the method further comprises measuring an amount of deviation of concentricity in the measurement step and setting a position of a welding end so that a length of welding overlap after the circumferential welding changes in accordance with the amount of deviation.

According to a fourth aspect of the present invention, there is provided a method of welding a hollow member and an insertion member to form a composite member comprising preparing a hollow member and an insertion member, inserting the insertion member in the hollow member, measuring a direction of deviation and an amount of deviation of concentricity of the two in a measurement step, and circumferentially welding the entire circumference of an overlap portion where the hollow member and the insertion member overlap by making a plurality of welding heads arranged axially symmetrically rotate relative to the circumference of the overlap portion when the amount of deviation of concentricity measured in the measurement step is within an allowable range.

Preferably, the method further comprises partially welding the overlap portion to provide a partial weld at a position opposite in direction to the direction of deviation after circumferentially welding the overlap portion so as to correct the concentricity of the composite member in a corrective welding step when the amount of deviation of the concentricity measured in the measurement step is outside the allowable range.

Alternatively, the method further comprises changing an amount of melting when providing the above partial weld in accordance with the amount of deviation of the concentricity measured in the measurement step.

More preferably, the method further comprises welding the entire circumference of the overoverlap portion using a single welding head using as a weld start a position opposite in direction to the direction of deviation of concentricity when the amount of deviation measured at the measurement step is outside an allowable range.

Still more preferably, the method further comprises measuring an amount of deviation of the concentricity in the measurement step and setting a position of a welding end so that a length of welding overlap after said circumferential welding changes in accordance with that amount of deviation.

Still more preferably, the method comprises that said insertion member is press-fitted in the hollow portion.

BRIEF DESCRIPTION OF THE DRAWINGS

These and other objects and features of the present invention will become clearer from the following description of the preferred embodiments given with reference to the accompanying drawings, in which:

FIG. 1(a) is a plane view of a valve structure obtained by a method of a first embodiment of the present invention, while

FIG. 2 is an exploded view of the valve structure in the first embodiment;

FIG. 5(a) is a lateral sectional view of the valve structure provided with spot welds in the first embodiment, while

FIG. 7(a) is a view explaining an order by which spot welds are given to the valve structure in the first embodiment, while

FIG. 9 is a graph of the relationship between the number of spot welds and the cumulative amount of contraction in a test piece in the first embodiment;

FIG. 10 is a view explaining a welding apparatus used in a regular welding step and corrective welding step in the first embodiment;

FIG. 11 is a view explaining a method of simultaneously performing the regular welding step and corrective welding step in a method according to a second embodiment of the present invention;

FIG. 12(a) is a perspective view of an axial end-to-end distance in the present invention, while

FIG. 13(a) is a plane view of a valve structure according to the related art, while FIG. 13(b) is a longitudinal sectional view;

FIG. 14(a) is an exploded view of a valve structure obtained by a method of a fourth embodiment of the present invention, while FIG. 14(b) is a longitudinal sectional view;

FIG. 18(a) is a top view showing a direction of deviation of a composite member in the fourth embodiment, while

FIG. 20(a) is a perspective view of the shape of a partial weld in the fourth embodiment, while

FIG. 21 is a graph of the manner of correction of the center axis in the corrective welding step in the fourth embodiment;

FIG. 22 is a graph of the relationship between a welding range and amount of deformation in the melting determination step in the fourth embodiment;

FIG. 23(a) is a perspective view of a welding step using two welding heads in a fifth embodiment of the present invention, while

DESCRIPTION OF THE PREFERRED EMBODIMENTS

First, the general aspects of the present invention will be explained, then specific embodiments will be described.

As explained in the summary of the invention, according to a first aspect of the present invention, there is provided a method of welding a hollow member and an insertion member to form a composite member comprising preparing a hollow member and an insertion member, inserting the insertion member in the hollow member, and partially welding an overlap portion where the hollow member and the insertion member overlap correct an axial end-to-end distance of the hollow member and the insertion member in a corrective welding step.

What should be noted the most in this aspect of the present invention is the partial welding of the overlap portion to provide a partial weld and correct the axial end-to-end distance in the corrective welding step.

Explaining the action of this aspect of the present invention providing the corrective welding step of correcting the axial end-to-end distance of the composite member, since contraction stress arises in the axial direction due to the provision of the partial weld, the axial end-to-end distance contracts (see later explained FIG. 9). Therefore, by suitably controlling the number and sizes of the partial welds, it is possible to change the magnitude of the contraction stress and thereby control the amount of contraction in the axial direction. Accordingly, it is possible to correct the axial end-to-end distance. Further, the manufacturing cost and material cost become lower since no spacer or other special member is used in this aspect of the present invention. Accordingly, in the present invention, it is possible to provide a method of welding a composite member giving a high dimensional accuracy in the axial direction.

Figure 12A:
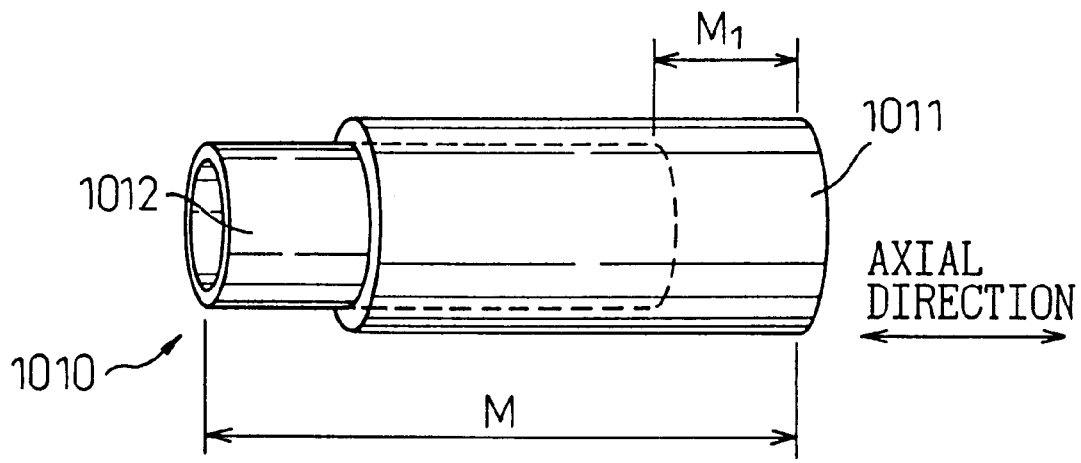
Figure 12B:
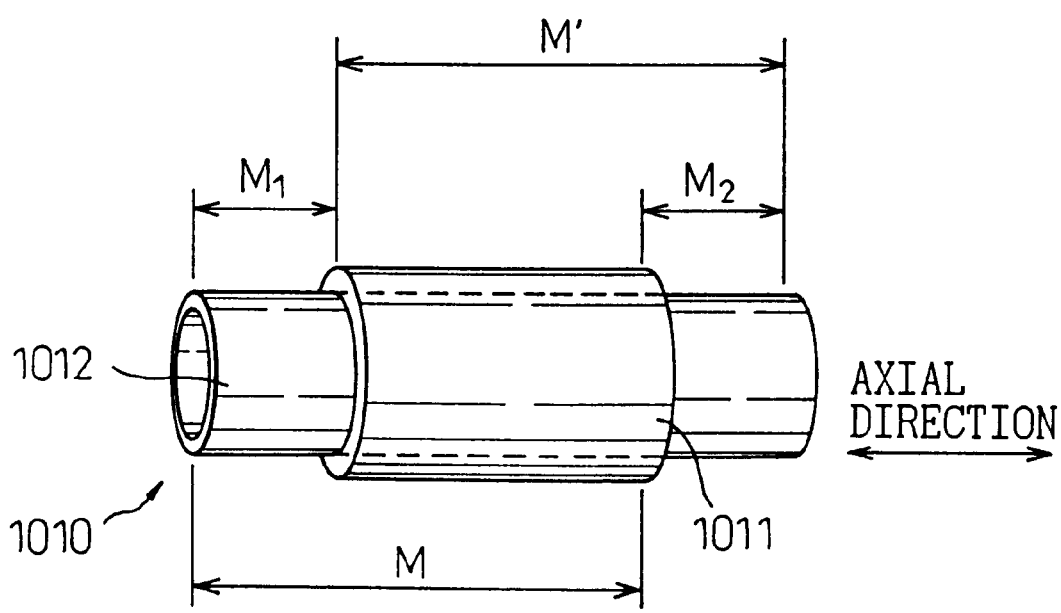
FIG. 12(b) is a perspective view of another axial end-to-end distance in the present invention.

FIG. 12(a) and FIG. 12(b) show examples of the axial end-to-end distance of different composite members. In FIG. 12(a) and FIG. 12(b), the axial end-to-end distance M1 is the distance in the axial direction from the end of the hollow member 1011 to the end of the insertion member 1012. Further, the "axial direction" means the direction parallel to the center axis of the composite member. The composite member includes shapes other than the above. In this case, the axial end-to-end distances M and M' are set in accordance with the composite member. In FIG. 12(b), the axial end-to-end distance M includes the projecting part M1 of the insertion member, while the axial end-to-end distance M' includes the projecting part M2 of the insertion member.

The partial weld in the present invention may be provided by welding using a high energy beam. By this, it is possible to reliably provide a partial weld at the targeted position and therefore correct the axial end-to-end distance with a high accuracy. Note that a laser may be used as a high energy beam.

The hollow member and the insertion member may be joined together by the partial welds provided in the corrective welding step. This makes it possible to simplify the manufacturing process. Further, it is possible to shorten the manufacturing time.

A regular welding step of circumferentially welding the entire circumference of the overlap portion of the hollow member and the insertion member may also be included. This enables the hollow member and the insertion member to be strongly joined and a composite member superior in the air-tightness of the overlap portion to be obtained. If joining the hollow member and insertion member by the regular welding step in this way, it is possible to perform the regular welding step and the corrective welding step using the same welding apparatus.

The corrective welding step and the regular welding step may be performed simultaneously by a plurality of welding heads. This enables the manufacturing process to be shortened.

The insertion member may be provisionally fastened to the hollow member by press-fitting. By this, it is possible to reduce the deviation of the welded parts and ease the working stress since the working stress is applied not only at the welds, but also the press-fit surfaces.

The corrective welding step may be performed by providing at least one pair of partial welds at axially symmetric positions (A–H) at the overlap portion. By this, it is possible to make equal corrections axially symmetrically at the overlap portion. As a result, it is possible to make corrections equally axially symmetrically and possible to correct dimensions without warping in the axial direction of the composite member.

A step of measuring the axial end-to-end distance of the composite member each time performing the corrective welding step and continuing the corrective welding step until the axial end-to-end distance reaches a predetermined length may also be included. By this, it is possible to alternately perform the corrective welding step and the measurement step and perform the corrective welding step until obtaining the desired length. Further, since the measurement and correction are alternately performed, it is possible to ensure the dimensions fall within a suitable range. That is, it is possible to flexibly control the dimensions in the steps before welding. Note that it is also possible not to perform the measurement step as an independent step, but for example to measure the axial end-to-end distance in real time and simultaneously perform the corrective welding step.

A step of determining the amount of melting before the corrective welding and performing the corrective welding step in accordance with the amount of melting determined in the melting determination step may also be included. The melting determination step preferably determines the amount of melting by basic data collected in advance in accordance with the difference between the axial end-to-end distance before the corrective welding of the composite member and the desired axial end-to-end distance. By this, it is possible to set the amount of welding so that the basic data falls within a desired distance and reliably make correction in accordance with the difference in dimensions. Note that "determination of the amount of welding" means to select partial welds suitably combining the size, length, position, and number of partial welds and giving a desired amount of contraction.

According to the first aspect of the invention, it is possible to provide a method of welding a hollow member and an insertion member to form a composite member with a high dimensional accuracy in the axial end-to-end distance.

According to the second aspect of the present invention, there is provided a method of welding a hollow member and an insertion member to form a composite member comprising preparing a hollow member and an insertion member, inserting the insertion member in the hollow member, and partially welding an overlap portion of the hollow member and the insertion member to correct a concentricity of the composite member in a corrective welding step.

What should be noted the most in the second aspect of the present invention is the provision of a partial weld at the overlap portion so as to correct the concentricity of the composite member in a corrective welding step.

Explaining the actions of this aspect of the invention, the provision of the partial weld results in the generation of contraction stress. so a tilt toward the position of provision of the partial weld occurs in the insertion member with respect to the hollow member. Accordingly, it is possible to adjust the direction of tilt of the insertion member by suitably controlling the position of provision of the partial weld. Further, it is possible to adjust the angle of tilt and the magnitude of tilt by suitably controlling the size and length of the partial weld.

Therefore, it is possible to correct the concentricity of a composite member with an insertion member originally joined to a hollow member at an angle and with the center axis of the hollow member and the center axis of the insertion member not aligned (with a low concentricity) (see later FIGS. 18(a) and 18(b) and FIG. 19) and thereby obtain a composite member with the hollow member and insertion member aligned in center axes and thereby superior in concentricity.

That is, according to the second aspect of the present invention, it is possible to provide a method of welding a hollow member and an insertion member to form a composite member giving a superior concentricity.

The partial weld in this aspect of the present invention may be provided by welding using a high energy beam. By this, it is possible to reliably provide a partial weld at the targeted position and therefore correct the concentricity with a high accuracy. Note that a laser may be used as a high energy beam.

Figure 19:
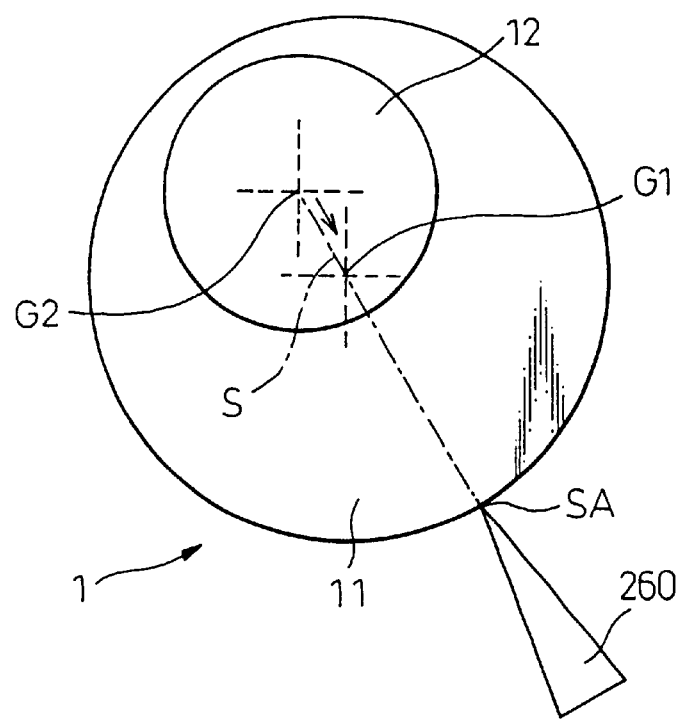
FIG. 19 is a top view explaining a direction of deviation and a position of provision of a partial weld in the fourth embodiment.

When correcting the concentricity by providing a single partial weld, as shown in FIG. 19, the partial weld is provided at a position SA of intersection of an extension of the line S from the center axis G2 of the insertion member 12 to the center axis G1 of the hollow member 11 with the outer circumference of the hollow member 11. Note that reference numeral 260 in FIG. 19 indicates the laser beam used for the laser welding.

It is also possible to correct the concentricity by providing a plurality of partial welds.

Figure 20A:
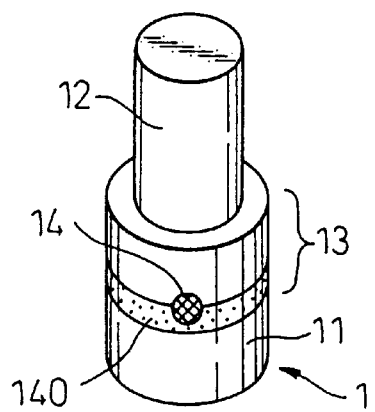
Figure 20B:
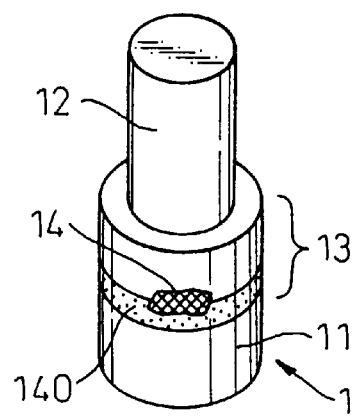
FIG. 20(b) is a perspective view of another shape of a partial weld in the fourth embodiment.

As shown in the later mentioned FIG. 20(a), the partial weld may be of a spot shape. Further, as shown in FIG. 20(b), it may be of a line shape extending outward to the certain degree in the circumferential direction. The welding range, position, and size (area and length etc.) of the partial welds may be freely set.

The hollow member and the insertion member may be joined by the partial weld provided in the corrective welding step. By this, when air-tightness is not required in the welding, it is possible to secure the required quality by the minimum amount of welding and shorten the welding time.

A regular welding step of circumferentially welding the entire circumference of the overlap portion of the hollow member and the insertion member may also be included. This enables the hollow member and the insertion member to be strongly joined and a composite member superior in the air-tightness of the overlap portion to be obtained. The part weld may be provided at the same location as the circumferential weld provided in the regular welding step or at a different location.

The corrective welding step and the regular welding step may be performed consecutively. This enables shortening of the welding time.

A step of measuring an amount of deviation and direction of deviation of concentricity of the composite member for each corrective welding step and continuing the corrective welding step until the amount of deviation and direction of deviation of concentricity fall within a desired range may also be included. That is, it is possible to alternately perform the corrective welding step and measurement step and continue the corrective welding until obtaining a desired length. According, it is possible to obtain a grasp of the amount of deviation of the concentricity while welding and make corrections so that the amount of deviation or direction of deviation of the concentricity falls within a desired range. By this, it is possible to reduce manufacturing variations and produce a composite member having a high dimensional accuracy. Note that it is also possible not to perform the measurement step as an independent step, but for example to measure the axial end-to-end distance in real time and simultaneously perform the corrective welding step.

A step of determining the partial weld formation position and an amount of melting in accordance with basic data collected in advance about the amount of deviation and direction of deviation of the concentricity and performing the corrective welding step in accordance with the amount of melting determined in the melting determination step may also be included. By this, it is possible to determine the amount of melting using an algorithm obtained from the basic data and therefore shorten the welding time and improve the productivity. Note that "determination of the amount of welding" means to select partial welds giving the desired concentricity by suitably combining the size, number, etc. of partial welds.

According to the third aspect of the present invention, there is provided a method of welding a hollow member and an insertion member to form a composite member comprising preparing a hollow member and an insertion member, inserting the insertion member in the hollow member, measuring a direction of deviation of concentricity of the composite member in a measurement step, and welding the entire circumference of an overlap portion where the hollow member and the insertion member overlap using as a weld start a position opposite in direction to the direction of deviation of concentricity.

Since a contraction stress occurs at the weld start in circumferential welding, a tilt toward the weld start occurs in the insertion member. Therefore, the direction of deviation of the concentricity is measured in advance and the weld start is shifted to a position enabling correction of the deviation at the time of the circumferential welding. By this, the direction of tilt or the angle of tilt of the insertion member can be adjusted to correct the concentricity.

Further, the correction of the concentricity can be finished together at the time of joining the hollow member and the insertion member, so the welding process can be simplified. Further, the welding time can be shortened.

That is, according to the third aspect of the present invention, it is possible to provide a method of welding a hollow member and an insertion member to form a composite member giving a superior concentricity.

A step of measuring an amount of deviation of concentricity in the measurement step and setting a position of a welding end so that a length of welding overlap after the circumferential welding changes in accordance with the amount of deviation may also be included. Since it is possible to correct the concentricity in accordance with the overlap length, the concentricity can be corrected with a higher accuracy.

Note that the "welding overlap length" means the portion which is doubly welded in circumferential welding when welding around the overlap portion of the composite member, returning to the position where the welding was started, and welding past that weld start.

According to the fourth aspect of the present invention, there is provided a method of welding a composite member comprising preparing a hollow member and an insertion member, inserting the insertion member in the hollow member, measuring a direction of deviation and an amount of deviation of the concentricity of the two in a measurement step, and circumferentially welding the entire circumference of an overlap portion where the hollow member and the insertion member overlap by making a plurality of welding heads arranged axially symmetrically rotate relative to the circumference of the overlap portion when the amount of deviation of the concentricity measured in the measurement step is within an allowable range.

By this, it is possible to using a plurality of welding heads to circumferentially weld so that weld starts and weld ends are formed uniformly in the circumferential direction. Therefore, the circumferential welding can be performed maintaining the initial high concentricity.

That is, according to the fourth aspect of the present invention, it is possible to provide a method of welding a hollow member and an insertion member to form a composite member giving a superior concentricity.

A step of partially welding the overlap portion to provide a partial weld at a position opposite in direction to the direction of deviation after circumferentially welding the overlap portion so as to correct the concentricity of the composite member in a corrective welding step when the amount of deviation of the concentricity measured in the measurement step is outside the allowable range may also be included.

Since a contraction stress occurs at the weld start in circumferential welding, a tilt toward the weld start occurs in the insertion member. Therefore, the direction of deviation of the concentricity is measured in advance and the weld start is shifted to a position enabling correction of the deviation at the time of the circumferential welding. By this, the direction of tilt or the angle of tilt of the insertion member can be adjusted to correct the concentricity.

A step of changing an amount of melting when providing the above partial weld in accordance with the amount of deviation of the concentricity measured in the measurement step may also be included. By this, the concentricity can be corrected with a high accuracy.

A step of welding the entire circumference of the overlap portion using a single welding head using as a weld start a position opposite in direction to the direction of deviation of concentricity when the amount of deviation measured at the measurement step is outside an allowable range may also be included. By this, the weld start is shifted to a position enabling correction of the deviation at the time of circumferential welding, so the circumferential welding can be performed while correcting the concentricity. In this case, since the correction of the concentricity can be finished together when joining the hollow member and the insertion member, the welding process can be simplified and the welding time can be shortened.

A step of measuring an amount of deviation of the concentricity in the measurement step and setting a position of a weld end so that a weld overlap length after the circumferential welding changes in accordance with that amount of deviation may also be included. Since it is possible to correct the concentricity in accordance with the overlap length, the concentricity can be corrected with greater accuracy.

A step of press-fitting the insertion member in the hollow portion in said inserting step may also be included. By this, the working stress acts not only on the portion to be welded, but also the portions in the press-fit state. Therefore, it is possible to ease the stress on the portion to be welded, improve the durable quality in addition to the initial quality, and prolong the service life.

According to the third to fourth aspects of the present invention, it is possible to provide a method of welding a hollow member and an insertion member to form a composite member giving a superior concentricity.

Specific embodiments of the present invention will be described next.

First Embodiment

A method of welding according to a first embodiment of the present invention will be explained first using FIGS. 1(*a*) and 1(*b*) to FIG. 10.

Figure 1A:
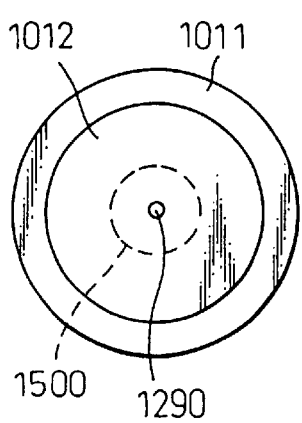
Figure 1B:
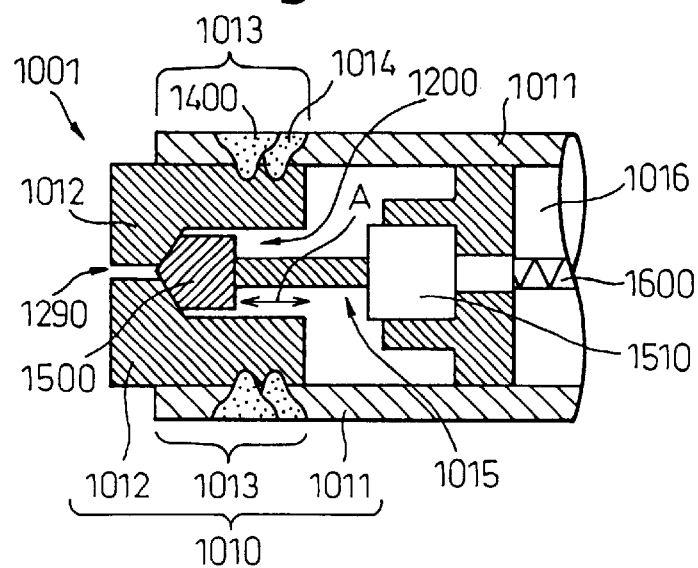
FIG. 1(b) is a longitudinal sectional view.

As shown in FIGS. 1(*a*) and 1(*b*), a hollow member 1011 and an insertion member 1012 are prepared, the insertion member 1012 is inserted in the hollow member 1011, and the two members are welded together in that state to prepare a composite member 1010.

Figure 7A:
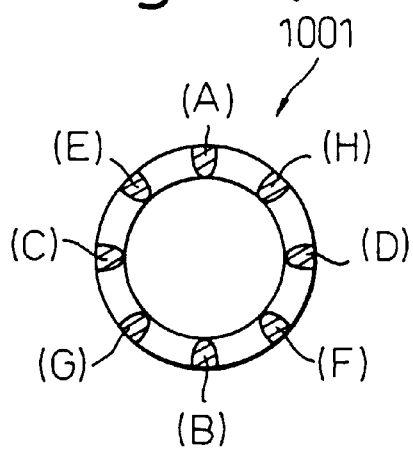
Figure 7B:
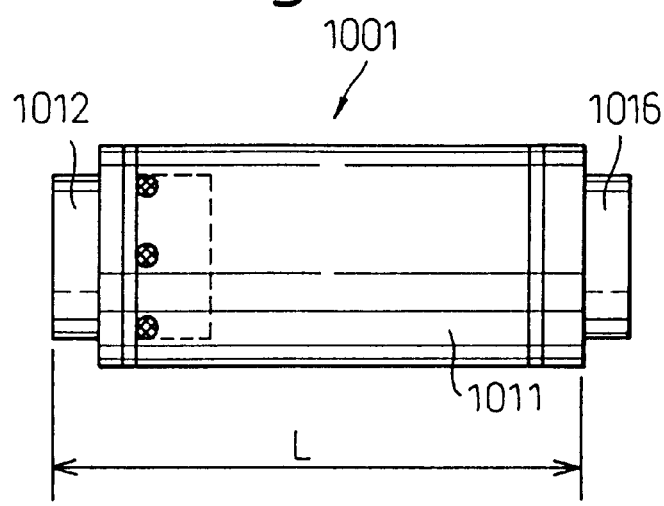
FIG. 7(b) is a view explaining an axial end-to-end distance L of a composite member in the valve structure.

At that time, partial welds, that is, spot welds 1014, are provided at the overlap portion 1013 where the hollow member 1011 and the insertion member 1012 overlap so as to correct the axial end-to-end distance L between the hollow member 1011 and the insertion member 1012 shown in FIG. 7(*b*) in a corrective welding step.

Next, the composite member 1010 obtained by the method of the first embodiment will be explained.

The composite member 1010 is applied in the valve structure 1001 of a fuel injection system in an automobile engine. As shown in FIG. 1(*a*) and FIG. 1(*b*), this valve structure 1001 is provided with a hollow member 1011, that is, a housing, and an insertion member 1012 inserted in the housing, that is, a body.

A nozzle holder 1200 is provided inside the body. A fuel injection bore 1290 is provided in the center of the nozzle holder 120.

Further, the housing is provided with a needle 1015 arranged to be able to move in the axial direction of the valve structure 1010, that is, the direction of the arrow A, and has a nozzle portion 1500 at its front end.

Further, the needle 1015 is held by a holding member 1016 having a spring 1600.

Next, welding apparatuses 1002 and 1020 used in the welding step will be explained.

Each of these apparatuses, as shown in FIG. 10, is comprised of a waveform controller 1021, a pulse modulator 1022, a power supply 1023, and an oscillator 1024.

In the regular welding step, the welding apparatus 1002 uses a continuous wave (CW)-YAG laser, while in the corrective welding step, the welding apparatus 1020 uses a pulse YAG laser or CW-YAG laser. The laser beams are transferred from the oscillators 1024 by mirrors 1025 and sent through optical fibers 1026 to the welding heads 2630 and 2640.

Nozzles 2650 and 2660 for feeding an assist gas are provided at the locations of the welding.

Next, the method of manufacturing the fuel injection system valve structure using the method of welding of the first embodiment will be explained in detail.

As shown in FIG. 2, the required parts are prepared, then the insertion member 1012, that is, the body, is press-fit from the left in the figure in the housing, that is, the hollow member 1011. The needle 1015, spring 1060, and holding member 1016 are press-fit from the right in the figure.

Figure 3:
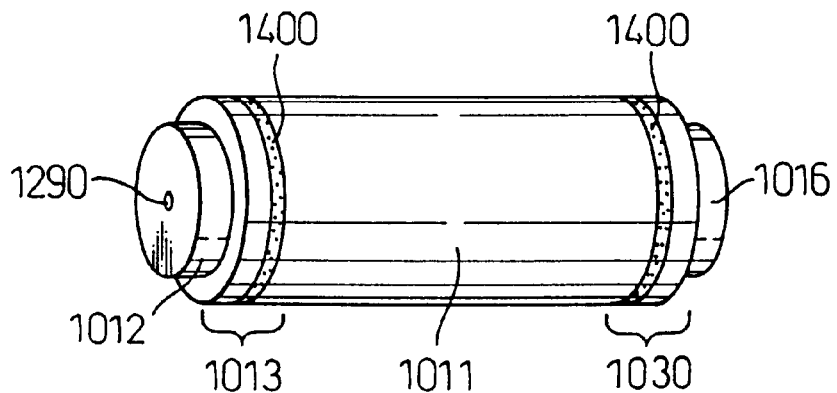
FIG. 3 is a perspective view of the valve structure in the first embodiment.

Next, as shown in FIG. 3, the overlap portion 1013 of the body and the housing and the overlap portion of the holding member 1016 and the housing are circumferentially welded.

This circumferential welding is performed using the welding head 2630 of the welding apparatus 1002 of FIG. 12.

Further, the circumferential welding is performed at this time by a laser output of 300 W, a processing speed of 12.5 mm/sec, a flow rate of argon gas of 20 liter/min, a frequency of 200 Hz, and a duty of 50%.

This constitutes the regular welding step of the first embodiment.

A corrective welding step is performed after the regular welding step of the first embodiment. Before the corrective welding step, however, the following process is performed.

That is, a test piece of a composite member produced by circumferentially welding members of the same shape and same material as the housing and body of the first embodiment in the same way as above is prepared.

The test piece was spot welded by a pulse TAG laser and the intensity and irradiation time of the laser beam required for the corrective welding and the relationship between the number of spot welds and the amount of contraction of the axial end-to-end distance L were measured.

The results of measurement are shown in the graph of FIG. 9.

Note that the spot welds were obtained at this time by a laser output of 20 J/p, a pulse width of 20 msec, and a flow rate of argon of 10 liter/min.

Figure 4:
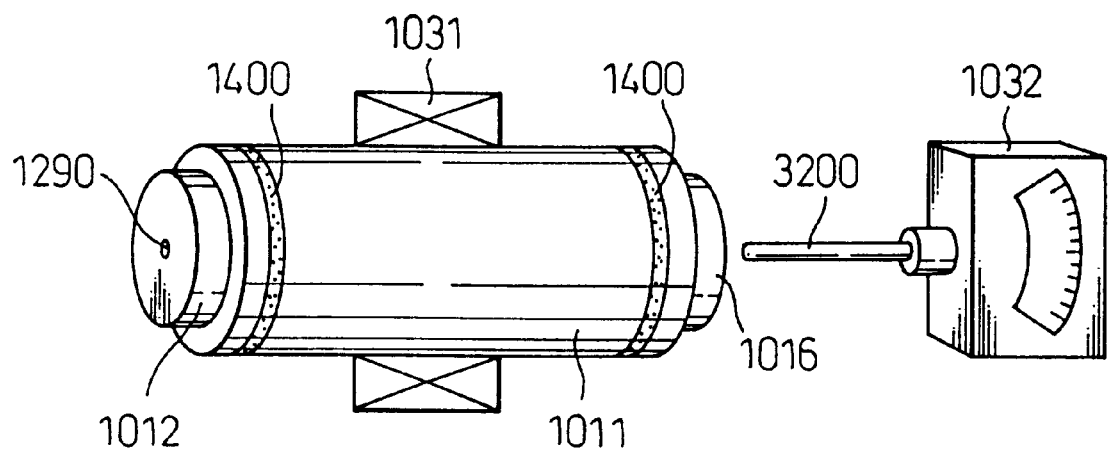
FIG. 4 is a perspective view of the arrangement of the valve structure and a contact type distance sensor for measuring the same.
Figure 6:
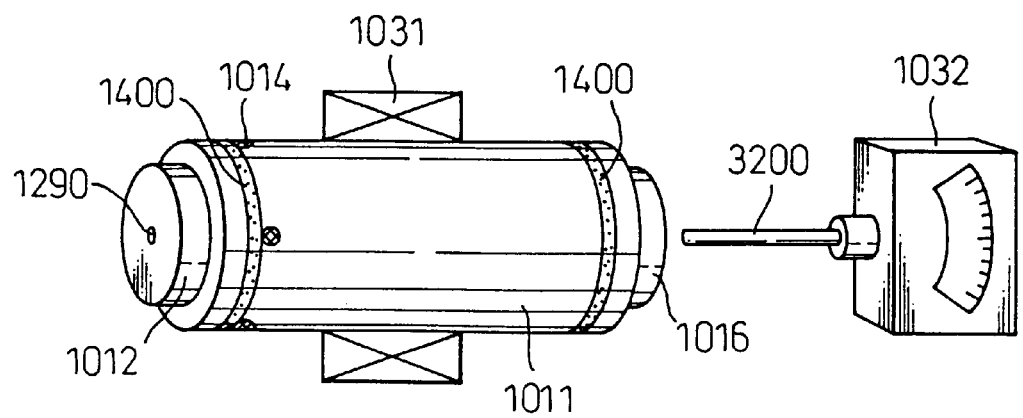
FIG. 6 is a perspective view of the arrangement of the valve structure provided with the spot welds and a contact type distance sensor in the first embodiment.

Next, as shown in FIG. 4 and FIG. 6, a coil 1031 is arranged at the center of the outer circumference of the housing. Further, a contact type distance sensor 1032 having a contact probe 3200 is arranged to the left of the housing.

In this state, a current is passed through the coil 1031, the magnetic circuit is turned from on to off, and the amount of movement of the needle 1015 at that time is measured by the contact type distance sensor 1032.

The axial end-to-end distance L of the current point (after end of regular welding step) is measured from the amount of movement of the needle 1015.

The number of spot welds 1014 required to obtain the required distance L is found from the value of the axial end-to-end distance L of the current point of time and FIG. 9. In the first embodiment, at least five spot welds are necessary.

Next, at least the number of spot welds found are provided at the overlap portion 1013.

The order of formation of the spot welds 1014 will be explained next.

At this time, sets of two spot welds in an axially symmetric positional relationship are formed.

Figure 5A:
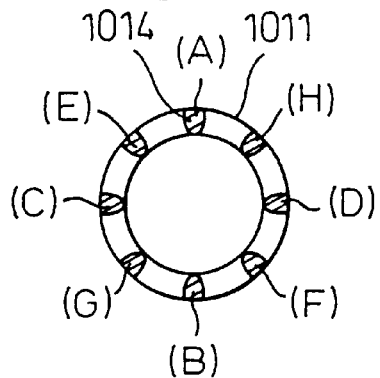
Figure 5B:
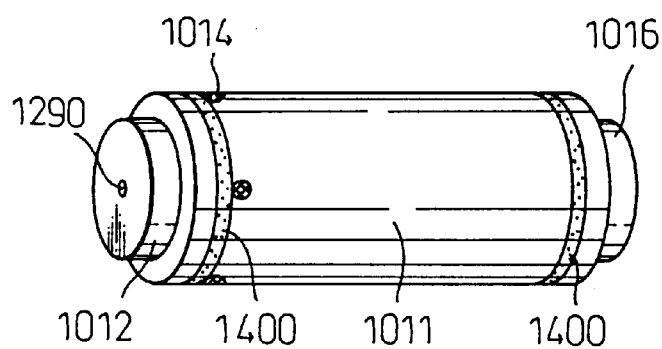
FIG. 5(b) is a longitudinal sectional view.

As shown in FIGS. 5(*a*), 5(*b*), 7(*a*) and 7(*b*), a first spot weld (A) is provided at a suitable position, then a spot weld (B) is provided so as to be in an axially symmetric positional relationship with the weld (A). Next, a spot weld (C) is provided at a position at a right angle with the line connecting the positions of the welds (A) and (B), then a spot weld (D) is provided at an axially symmetric position with the weld (C).

Next, a spot weld (E) is provided at the center of the distance between the welds (A) and (C), and a spot weld (F) is provided axially symmetrically with the weld (E). A spot weld (G) is provided at the center of the distance between the welds (C) and (B) and a spot weld (H) is provided at a position axially symmetric with the weld (G).

Note that the spot welding may also be performed by arranging emission optical units or laser heads of welding apparatuses at axially symmetric positions and simultaneously welding the spot welds at axially symmetric positions.

Further, when more than eight spot welds are required, they may be suitably provided axially symmetrically by a procedure similar to the above.

The spot welding at this time is performed using the welding apparatus 1020 shown in FIG. 10.

The spot weld (A) is provided by the welding held 2640 on the valve structure 1001 after the regular welding step is completed by the welding head 2630, then the structure is rotated in the direction of the arrow V and the spot weld (B) is provided. Further, the structure is rotated and welded so that the location for provision of the spot weld (C) comes directly under the welding head 2640.

Following this, sets of spot welds are successively provided at axially symmetric positions by a similar procedure.

Figure 8:
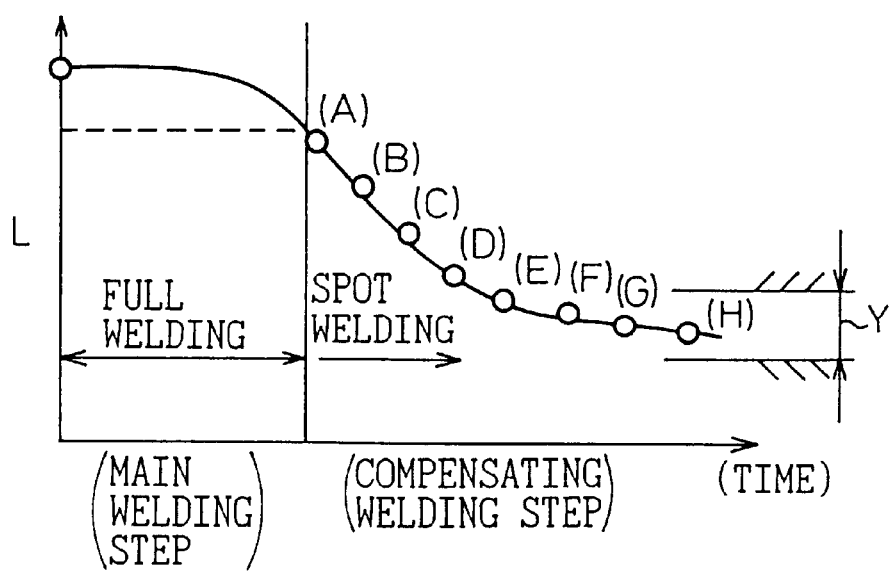
FIG. 8 is a graph of the change of the axial end-to-end distance L in a regular welding step and a corrective welding step in the first embodiment.

FIG. 8 is a graph plotting actual lengths of the distance L in the regular welding step and corrective welding step. Note that "Y" in the figure indicates the allowable range of the length of "L".

As shown in the figure, it was learned that by providing the spot welds in the corrective welding step, the length of "L" gradually is reduced and the length of "L" reaches the allowable range at the fifth spot weld.

The action and effects of the first embodiment will be explained next.

In the first embodiment, provision is made of a corrective welding step of providing spot welds 1014 at the overlap portion 1013 so as to correct the axial end-to-end distance L of the composite member 1010.

By providing the spot welds 1400, contraction stress occurs and, as shown in FIG. 8 and FIG. 9, the axial end-to-end distance L contracts. Therefore, by suitably changing the number or position or other spot welding conditions of the spot welds 1400 in accordance with the amount of correction, it is possible to control the size of the contraction stress. Due to this, the amount of contraction can be controlled.

Therefore, it is possible to correct the axial end-to-end distance L of the composite member 1010.

Further, in the first embodiment, no spacer or other special member is used, so the manufacturing cost and material cost both become lower.

According to the first embodiment, therefore, it is possible to provide a method of welding a composite member giving a high dimensional accuracy in the axial direction.

Note that it is also possible to repeatedly perform the corrective welding step and measurement of "L", that is, provide the required number of spot welds 1014 by the above procedure, then arrange the coil again and find the length of "L" at the present point of time from the amount of movement of the needle, until the length of "L" falls firmly within the allowable range.

Second Embodiment

Next, an explanation will be given of the case of simultaneously performing the corrective welding step and regular welding step with reference to FIG. 11 as a second embodiment of the present invention.

The apparatuses of the first embodiment shown in FIG. 10 are used as the welding apparatuses.

In the second embodiment, however, the two welding heads 2630 and 2640 are simultaneously used.

Further, a single welding head may also be used if it can be suitably controlled.

As shown in FIG. 11, the composite member 1010 is rotated in the direction of the arrow V shown in FIG. 11. By rotating the composite member 1010, the regular welding step is performed by the welding heads 2630, while spot welding is performed by the welding head 2640 from the portion where the regular welding step is finished.

At this time, it is also possible to perform the corrective welding step while measuring the axial end-to-end distance L in real time using a contact type distance sensor etc.

The rest of the details are the same as in the first embodiment.

Further, there are analogous actions and effects as in the first embodiment.

Third Embodiment

In the first and second embodiments, the axial end-to-end distance was corrected by spot welds. In the corrective welding step as well, it is possible to use a CW-YAG laser to provide partial welds having predetermined lengths in the circumferential direction at the overlap portion of the hollow member and insertion member.

In the third embodiment as well, it is preferable to find the amount of melting required for correction by calculation in advance, divide this equally into two or three, and provide partial welds at axially symmetric positions.

Fourth Embodiment

Next, the method of welding according to a fourth embodiment of the present invention will be explained with reference to FIGS. 14(a) and 14(b) and FIG. 15 to FIG. 24.

Figure 15:
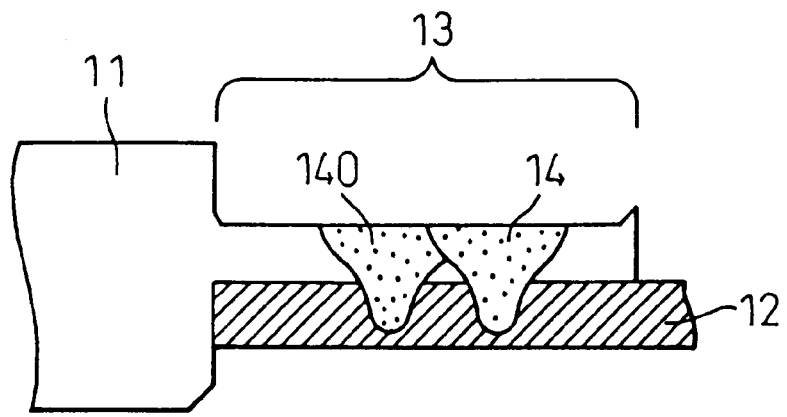
FIG. 15 is a sectional view of an overlap portion in the fourth embodiment.

As shown in FIGS. 14(a) and 14(b) and FIG. 15, a hollow member 11 and insertion member 12 are prepared, the insertion member 12 is inserted in the hollow member 11, and the two are joined in that state to obtain a composite member 1. During this process, a corrective welding step is provided comprising providing a partial weld 14 at the overlap portion 13 where the hollow member 11 and insertion member 12 overlap so as to correct the concentricity of the composite member 1.

Next, the composite member 1 of the fourth embodiment will be explained.

The composite member 1 is used for a valve structure 3 of a fuel injection system of an automobile engine. As shown in FIG. 14(a) and FIG. 14(b), the valve structure 3 has a hollow member 11, that is, a holder, and an insertion member 12, that is, pipe, inserted in the holder. The holder is cylindrical in shape with a closed bottom. The cylindrical body 315 is inserted and accommodated in the holder.

The overlap portion 331 where the holder and the body overlap and the overlap portion 13 where the holder and the pipe overlap are circumferentially welded. Reference numerals 140 and 340 show the circumferential welds.

Next, as shown in FIG. 15, a partial weld 14 is provided so as to overlap the circumferential weld 140.

The maximum diameter of the holder is 18 mm, the outside diameter of the body 315 is 8 mm, and the outside diameter of the pipe is 11 mm.

Next, the method of manufacture of the fuel injection system valve structure using the method of welding of the fourth embodiment will be explained in detail.

As shown in FIG. 14(a) and FIG. 14(b), the required parts are prepared, then the body 315 and the insertion member 1012, that is, pipe 11, are press-fit in the holder, that is, the hollow member 11, then the overlap portions 13 and 331 are circumferentially welded.

The circumferential welding at this time is performed by a laser output of 300 W, a processing speed of 12.5 mm/sec, a flow rate of argon gas of 20 liter/min, a frequency of 200 Hz, and a duty of 50%.

This constitutes the regular welding step of the fourth embodiment.

A corrective welding step is performed after the regular welding step of the first embodiment. Before the corrective welding step, however, the following melting determination step is performed.

That is, a test piece of a composite member produced by circumferentially welding members of the same shape and same material as the holder and pipe of the fourth embodiment in the same way as above is prepared.

The test piece was spot welded and the intensity and irradiation time of the laser beam required for the corrective welding or the relationship between the welding range (angle) of the partial weld in the circumferential direction of the hollow member and the deformation were measured.

The results of measurement of the fourth embodiment are shown in the graph of FIG. 22.

The partial weld is formed at overlap portions of the composite member. The welding range of the partial weld in the circumferential direction of the hollow member is shown by angle on the abscissa of FIG. 22. That is, when welding the entire circumference of the overlap portion, the welding range is 360 degrees, while when forming a partial weld across half the circumference of the overlap portion, the welding range is 180 degrees.

Further, the amount of deformation of the ordinate shows the amount of deformation of the concentricity of the insertion member with respect to the hollow member toward the intermediate position of the welding range of the partial weld.

As clear from FIG. 22, if the welding range is made large, the deformation of the concentricity increases up to a range of 180 degrees, but when the welding range exceeds 180 degrees, the deformation gradually falls.

Even with circumferential welding (welding range of 360 degrees), however, since the amounts of melting of the material at the weld start and the weld end are greater than at other portions, a deformation of about 10 $\mu$m is obtained.

Note that the partial weld at this time is obtained using the same conditions as the conditions of the circumferential welding, but changing the welding angle or changing the opening and closing time of the shutter of the laser beam emission unit in the welding apparatus.

It is not however necessary to make the conditions for formation of the partial weld the same as the conditions of the circumferential welding. For example, the laser output can also be changed. In this case, the curve in FIG. 22 moves parallel up or down, so it is also possible to examine the range of the deformation required in advance and set the laser output accordingly.

Figure 16:
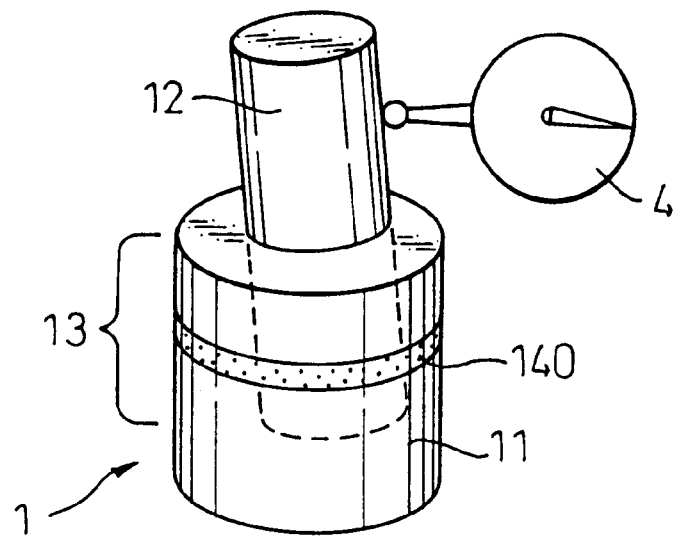
FIG. 16 is a perspective view explaining a measurement step in the fourth embodiment.

Next, as shown in FIG. 16, the amount deviation and the direction of deviation of the concentricity of the composite member 1 are measured using a dial gauge 4 in a measurement step.

The direction of deviation and the amount of deviation of the concentricity to be measured will be explained next.

FIG. 18($a$) is a plan view of a composite member 1, while FIG. 18($b$) is a side view. As shown in FIG. 18($a$), the angle $\theta 1$ between the reference line X passing through the center axis G1 of the hollow member 11 and the line Y from G1 to G2 is the direction of deviation.

Further, as shown in FIG. 18($b$), the angle formed by the center axis G1 of the hollow member 11 and the center axis G2 of the insertion member 12 is the amount of deviation $\theta 2$.

Note that in FIG. 18($a$) and FIG. 18($b$), the hollow member 11 and the insertion member 12 are shown simplified.

The position of provision of the partial weld 14 and the size etc. of the partial weld required for correction of the concentricity are determined from FIG. 22 and the amount of deviation and the direction of deviation measured.

The position of provision of the partial weld is made a range centered about a point SA of intersection of the line L extending from the line from G2 to G1 with the outer circumference of the hollow member 11 as shown in FIG. 19.

Figure 17:
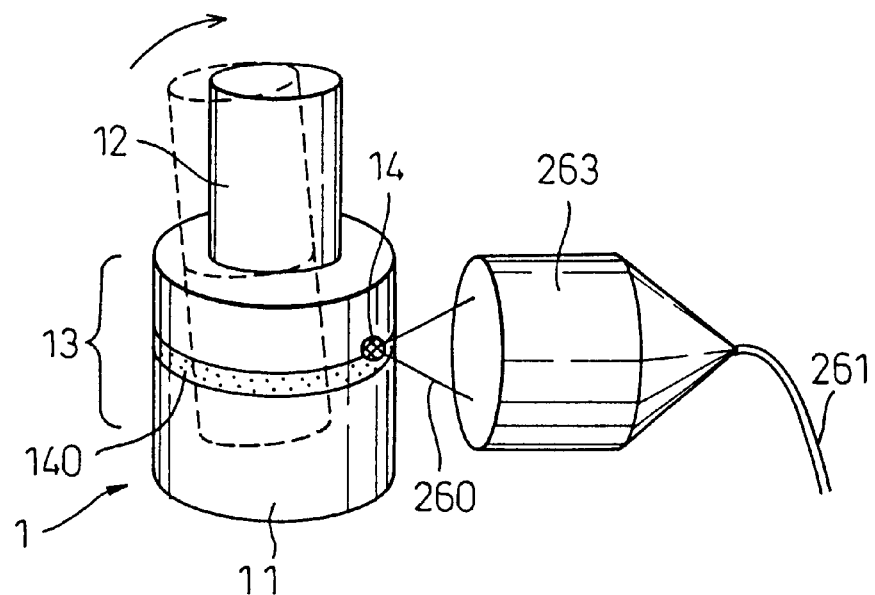
FIG. 17 is a perspective view explaining a corrective welding step in the fourth embodiment.

As shown in FIG. 17, the laser beam 260 is irradiated to provide a partial weld 14 in this range giving a deformation able to correct the amount of deviation (see FIG. 22). Note that reference numeral 263 is a laser head for emitting the laser beam 260 (see FIG. 24).

Examples of the shape of the partial weld 14 provided at this time are shown in FIG. 20($a$) and FIG. 20($b$).

FIG. 20($a$) shows a spot shaped partial weld 14. FIG. 20($b$) shows a line shaped partial weld 14. The shape and welding range of the partial weld 14 are suitably set in accordance with the amount of deviation desired to be corrected.

When measuring the concentricity after forming the partial weld 14 set in this way and finding that the amount of deviation remains large, it is possible to repeat the corrective welding step. In particular, when correcting the concentricity by forming a spot-shaped partial weld, it is possible to correct the concentricity with greater accuracy by alternately repeating the corrective welding and measurement of the concentricity.

This constitutes the corrective welding step.

Next, the correction of the concentricity of the composite member welded by the method according to the fourth embodiment was measured. The results are shown in FIG. 21. This will be explained next.

FIG. 21 plots the center axis of the insertion member against the center axis of the hollow member after the end of the circumferential welding for five different composite members. The points "a", "b", "c", "d1", and "d2" shown by the black circles are positions of the center axes of the insertion members of the different composite members. Further, G1 is the center axis of the hollow member 11.

As shown in FIG. 21, the point "a" has a direction of deviation with respect to the center axis G1 of 145 degrees and an amount of deviation of 7.5 $\mu$m. The other points have similar amounts of deviation and directions of deviation with respect to G1.

A laser beam was fired from a direction A on the overlap portion of the insertion member having the center axis at the position of the above "a" and the hollow member for corrective welding. Here, the direction of A is the same direction as the line extending from the line connecting "a" and G1 to the outer circumference of the composite member.

That is, the laser beam is focused on the overlap portion at a position in the direction opposite to the direction of deviation of the insertion member.

As a result of this corrective welding step, the center axis of the insertion member, which had been at the position "a", shifts to the position "a'". The direction of deviation of "a'" remained 145 degrees, but the amount of deviation was reduced to 5 $\mu$m.

The amounts of deviation of the points "b", "c", "d1", and "d2", were able to be reduced by corrective welding steps by the same procedure.

The action and effects of the fourth embodiment will be explained next.

The provision of the partial weld 14 causes a contraction stress, so a tilt toward the position of the provision of the partial weld 14 occurs at the insertion member 12.

By performing a corrective welding step providing a partial weld 14 based on the basic data determined at the melting determination step in advance, it is possible to correct the concentricity of the composite member 1 in the state with the center axis G1 and center axis G2 not aligned (see FIG. 18($a$) and FIG. 18($b$)) and obtain a composite member 1 superior in concentricity.

According to the fourth embodiment, therefore, it is possible to provide a method of welding a composite member superior in concentricity.

Fifth Embodiment

Next, an explanation will be given of a method of welding of a fifth embodiment with reference to FIGS. 23($a$) and 23($b$) and FIG. 24.

Figure 24:
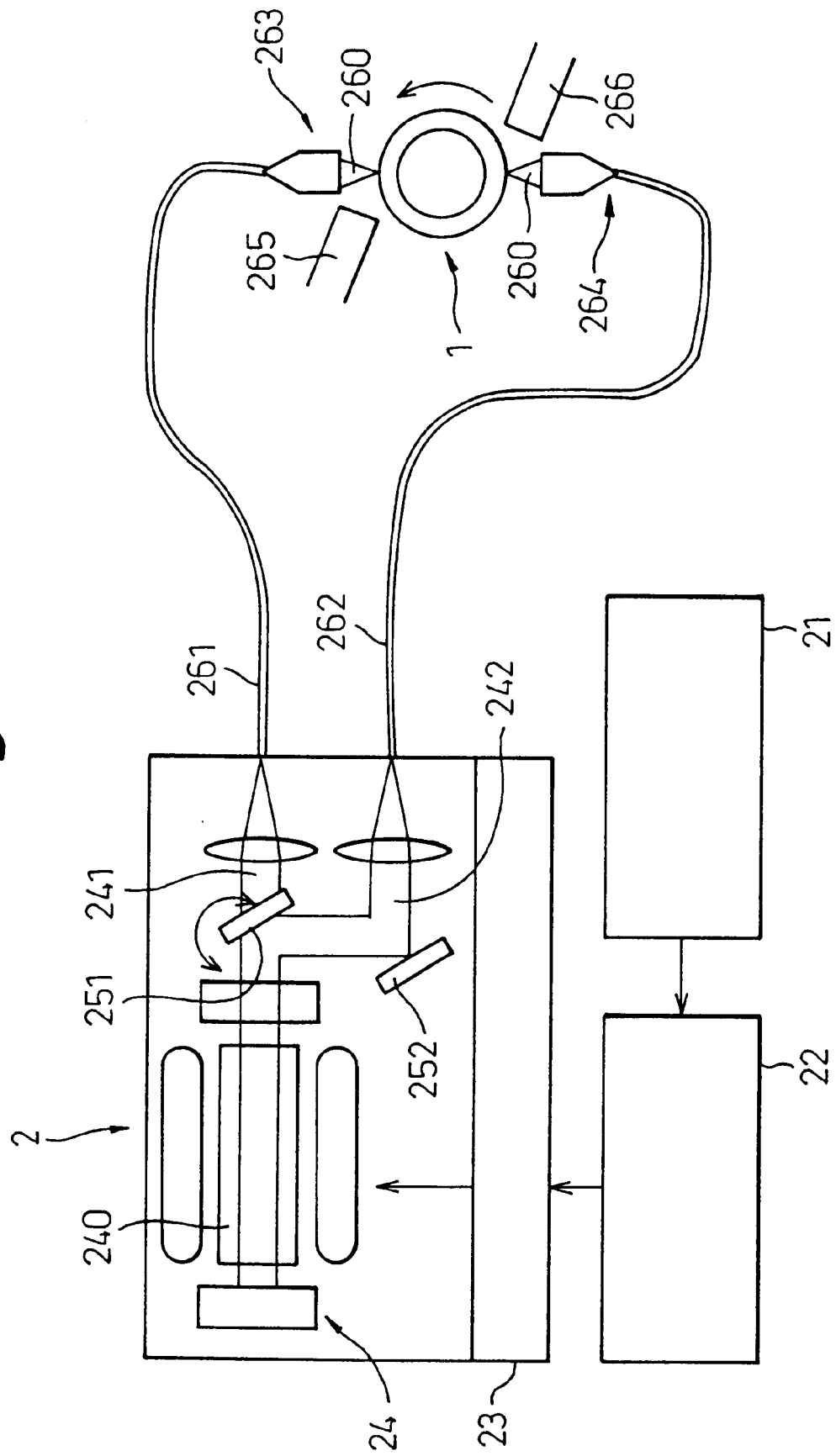
FIG. 24 is a plane view of a welding apparatus used in the fifth embodiment of the present invention.

The welding apparatus 2 used in the fifth embodiment, as shown in FIG. 24, is comprised of a waveform controller 21, a pulse modulator 22, a power supply 23, and an oscillator 24.

The laser beam 240 from the oscillator 24 is split by the mirror 251 and mirror 252 into the laser beam 241 and the laser beam 242. These are sent through the optical fibers 261 and 262 alternately or simultaneously to the welding heads 263 and 264 to enable laser beams 260 to be focused on the composite member 1.

Nozzles 265 and 266 are provided for feeding assist gas to the welding locations.

The method of welding according to the fifth embodiment will be explained next.

Figure 18A:
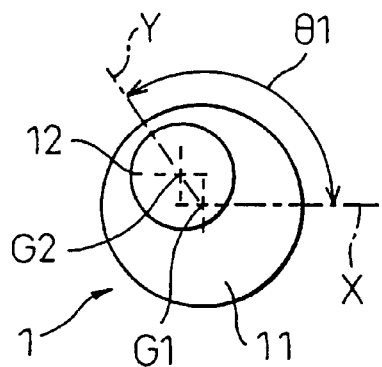
Figure 18B:
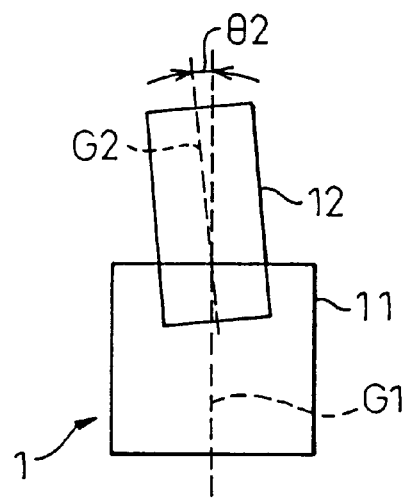
FIG. 18(b) is a side view showing an amount of deviation of a composite member in the fourth embodiment.

First, the insertion member 12 is press-fit into the hollow member 11, then the direction of deviation and amount of deviation of the concentricity of the two (see FIG. 18(a) and FIG. 18(b)) in that state are measured. This measurement step is performed using a dial gauge (see FIG. 16).

Figure 23A:
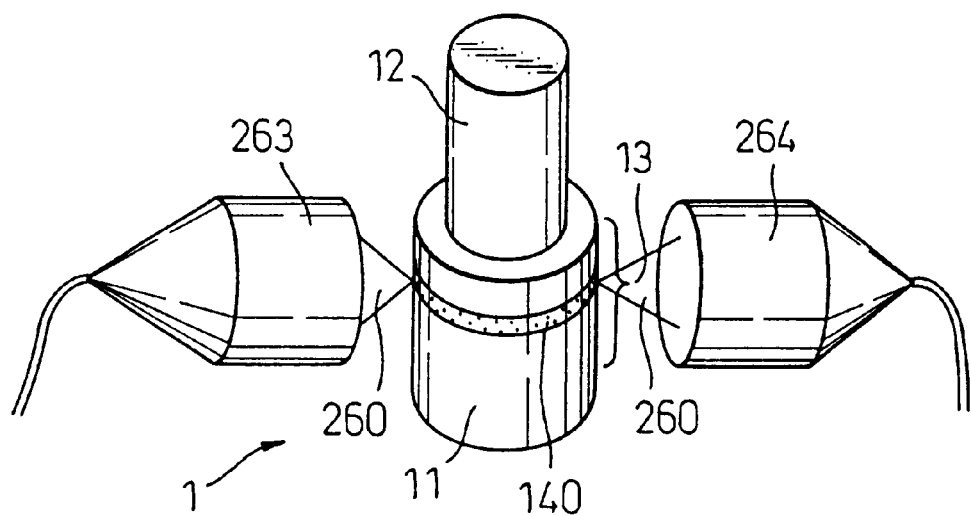

When the amount of deviation at this time is within an allowable range, as shown in FIG. 23(a), the two welding heads 263 and 264 of the welding apparatus 2 are set at positions facing each other across the composite member and the not yet welded composite member 1 is arranged at their center. The laser beams 260 are fired while rotating the composite member 1 relative to the two welding heads 263 and 264. Due to this, the entire overlap portion 13 is circumferentially welded.

Figure 23B:
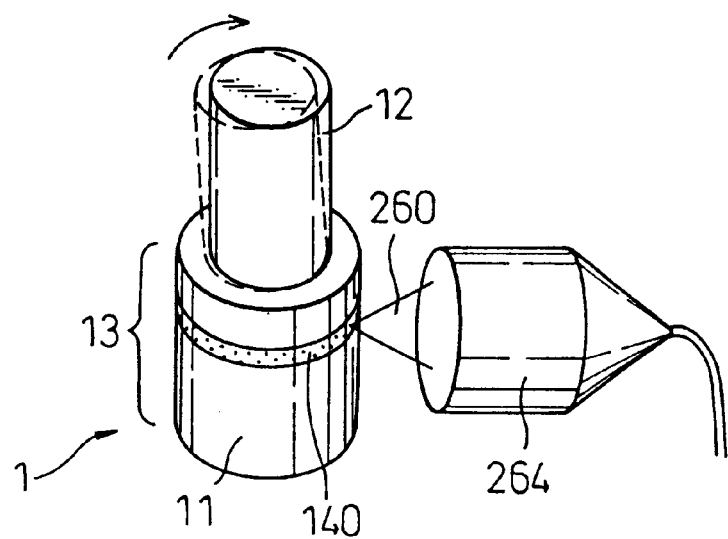
FIG. 23(b) is a perspective view of a welding step using one welding head in the fifth embodiment.

When the amount of deviation is larger than the allowable range, as shown in FIG. 23(b), one welding head 264 is used to circumferentially weld the entire overlap portion 13 using the direction of deviation as the weld start and end.

In the method of welding of the fifth embodiment, when the concentricity is within the allowable range at the stage where the insertion member 12 is press-fit in the hollow member 11, it is possible to use the two welding heads 263 and 264 for circumferential welding so as to form the weld start and end uniformly in the circumferential direction. Therefore, it is possible to circumferentially weld without deterioration of the initial concentricity.

Further, when the concentricity is outside the allowable range, as explained above, since the weld start and end end up at positions enabling correction of deviation at the time of circumferential welding, it is possible to perform the circumferential welding while correcting the concentricity.

Since it is possible to finish the correction of the concentricity all together when joining the hollowing member 11 and the insertion member 12 in this way, according to the method of welding of the fifth embodiment, it is possible to simply the process.

Further, it is possible to shorten the welding time.

Further, the position of the weld end can be changed in accordance with the amount of deviation set.

That is, when the amount of deviation is large, it is possible to continue welding even at the circumferential weld and make the weld start and end overlap.

Since it is possible to control the correction of concentricity in accordance with the overlap length, it is possible to correct the concentricity with a higher accuracy.

Further, when the amount of deviation is outside the allowable range, it is of course possible to first perform the circumferential welding and then perform the corrective welding step as in the fourth embodiment.

Note that in the fourth and fifth embodiments, the example was shown of circumferentially welding the overlap portion so as to ensure air-tightness of the composite member, but when air-tightness is not required, it is also possible to join the hollow member and the insertion member by the welds for correction of concentricity in the corrective welding step.

While the invention has been described with reference to specific embodiment chosen for purpose of illustration, it should be apparent that numerous modifications could be made thereto by those skilled in the art without departing from the basic concept and scope of the invention.

What is claimed is:

1. A method of welding a hollow member and an insertion member to form a composite member comprising:
    preparing a hollow member and an insertion member,
    inserting the insertion member in the hollow member, and
    partially welding an overlap portion where the hollow member and said insertion member overlap to correct an axial end-to-end distance of the hollow member and the insertion member in a corrective welding step.

2. A method of welding a hollow member and an insertion member to form a composite member as set forth in claim 1, wherein said hollow member and said insertion member are joined together by partial welds provided in the corrective welding step.

3. A method of welding a hollow member and an insertion member to form a composite member as set forth in claim 1, further comprising circumferentially welding the entire circumference of the overlap portion of the hollow member and the insertion member in a regular welding step.

4. A method of welding a hollow member and an insertion member to form a composite member as set forth in claim 3, further comprising simultaneously performing the corrective welding step and the regular welding step by a plurality of welding heads.

5. A method of welding a hollow member and an insertion member to form a composite member as set forth in claim 1, wherein said insertion member is press-fitted in the hollow member in said inserting step.

6. A method of welding a hollow member and an insertion member to form a composite member as set forth in claim 1, wherein at least one set of partial welds are provided at axially symmetric positions (A–H) at the overlap portion in the corrective welding step.

7. A method of welding a hollow member and an insertion member to form a composite member as set forth in claim 1, further comprising
    measuring the axial end-to-end distance of the composite member for each corrective welding step in a measurement step and
    continuing the corrective welding step until the axial end-to-end distance reaches a predetermined length.

8. A method of welding a hollow member and an insertion member to form a composite member as set forth in claim 1, further comprising:
    determining an amount of melting before the corrective welding step in a melting determination step and
    performing the corrective welding step in accordance with the amount of melting determined in the melting determination step.

9. A method of welding a hollow member and an insertion member to form a composite member comprising:
    preparing a hollow member and an insertion member,
    inserting the insertion member in the hollow member, and
    partially welding an overlap portion of said hollow member and said insertion member to correct concentricity of the composite member in a corrective welding step.

10. A method of welding a hollow member and an insertion member to form a composite member as set forth in claim 9, wherein said hollow member and said insertion member are joined together by partial welds provided in the corrective welding step.

11. A method of welding a hollow member and an insertion member to form a composite member as set forth in claim 9, further comprising welding the entire circumference of the overlap portion of the hollow member and the insertion member in a regular welding step.

12. A method of welding a hollow member and an insertion member to form a composite member as set forth in claim 9, further comprising consecutively performing the corrective welding step and the regular welding step.

13. A method of welding a hollow member and an insertion member to form a composite member as set forth in claim 9, further comprising measuring an amount of deviation and direction of deviation of the concentricity of said composite member for each corrective welding step and continuing the corrective welding step until the amount of deviation and direction of deviation of the concentricity fall within a desired range.

14. A method of welding a hollow member and an insertion member to form a composite member as set forth in claim 9, further comprising:

determining the partial weld formation position and an amount of melting in accordance with basic data collected in advance about the amount of deviation and direction of deviation of the concentricity and performing the corrective welding step in accordance with the amount of melting determined in the melting determination step.

15. A method of welding a hollow member and an insertion member to form a composite member comprising:

preparing a hollow member and an insertion member, inserting the insertion member in the hollow member, measuring a direction of deviation of concentricity of the composite member in a measurement step, and welding the entire circumference of an overlap portion where said hollow member and said insertion member overlap using as a weld start a position opposite in direction to the direction of deviation of the concentricity.

16. A method of welding a hollow member and an insertion member to form a composite member as set forth in claim 15, further comprising:

measuring an amount of deviation of concentricity in said measurement step and setting a position of a welding end so that a length of welding overlap after said circumferential welding changes in accordance with the amount of deviation.

17. A method of welding a hollow member and an insertion member to form a composite member comprising:

preparing a hollow member and an insertion member, inserting the insertion member in the hollow member, measuring a direction of deviation and an amount of deviation of the concentricity of the two in a measurement step, and circumferentially welding the entire circumference of an overlap portion where said hollow member and said insertion member overlap by making a plurality of welding heads arranged axially symmetrically rotate relative to the circumference of the overlap portion when the amount of deviation of the concentricity measured in said measurement step is within an allowable range.

18. A method of welding a hollow member and an insertion member to form a composite member as set forth in claim 17, further comprising:

partially welding the overlap portion to provide a partial weld at a position opposite in direction to the direction of deviation after circumferentially welding the overlap portion so as to correct the concentricity of said composite member in a corrective welding step when the amount of deviation of concentricity measured in said measurement step is outside the allowable range.

19. A method of welding a hollow member and an insertion member to form a composite member as set forth in claim 18, further comprising changing an amount of melting when providing the above partial weld in accordance with the amount of deviation of the concentricity measured in said measurement step.

20. A method of welding a hollow member and an insertion member to form a composite member as set forth in claim 17, further comprising welding the entire circumference of said overlap portion using a single welding head using as a weld start a position opposite in direction to the direction of deviation of concentricity when the amount of deviation measured at said measurement step is outside an allowable range.

21. A method of welding a hollow member and an insertion member to form a composite member as set forth in claim 20, further comprising measuring an amount of deviation of concentricity in said measurement step and setting a position of a welding end so that a length of welding overlap after said circumferential welding changes in accordance with the amount of deviation.

22. A method of welding a hollow member and an insertion member to form a composite member as set forth in claim 17, wherein said insertion member is press-fitted in said hollow portion in said inserting step.

* * * * *